(12) United States Patent
Bhakta et al.

(10) Patent No.: US 12,111,467 B2
(45) Date of Patent: Oct. 8, 2024

(54) ELECTRONIC DEVICE WITH MULTI-ELEMENT DISPLAY ILLUMINATION SYSTEM

(71) Applicant: Apple Inc., Cupertino, CA (US)

(72) Inventors: Vikrant Bhakta, Cupertino, CA (US);
Hyungryul Choi, San Jose, CA (US);
Guolin Peng, Santa Clara, CA (US);
Scott M. DeLapp, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 77 days.

(21) Appl. No.: 16/409,681

(22) Filed: May 10, 2019

(65) Prior Publication Data

US 2020/0004020 A1    Jan. 2, 2020

Related U.S. Application Data (60) Provisional application No. 62/691,513, filed on Jun. 28, 2018.

(51) Int. Cl.
| | |
|---|---|
| *G02B 27/01* | (2006.01) |
| *G02B 3/00* | (2006.01) |
| *G02B 27/10* | (2006.01) |
| *G02B 27/12* | (2006.01) |
| *G02B 27/30* | (2006.01) |

(52) U.S. Cl.
CPC ....... *G02B 27/0172* (2013.01); *G02B 3/0037* (2013.01); *G02B 27/1026* (2013.01); *G02B 27/126* (2013.01); *G02B 27/30* (2013.01); *G02B 2027/0114* (2013.01); *G02B 2027/013* (2013.01)

(58) Field of Classification Search
None
See application file for complete search history.

(56) References Cited

U.S. PATENT DOCUMENTS 4,058,753 A * 11/1977 Blacker .................. H01J 29/62
                                                      315/368.15
5,504,514 A     4/1996 Nelson
(Continued)

FOREIGN PATENT DOCUMENTS

| CN | 1541483 A | 10/2004 |
| CN | 1643565 A | 7/2005 |

(Continued)

*Primary Examiner* — Christopher Stanford
*Assistant Examiner* — Journey F Sumlar
(74) *Attorney, Agent, or Firm* — Treyz Law Group, P.C.; Michael H. Lyons (57) ABSTRACT

An electronic device may have a spatial light modulator. Control circuitry in the electronic device may use the spatial light modulator to generate images. A light source may be used to produce illumination for the spatial light modulator. An optical system may direct the illumination onto the spatial light modulator and may direct corresponding reflected image light towards eye boxes for viewing by a user. Head-mounted support structures may be used to support the spatial light modulator, light source, and optical system. The light source may include light-emitting elements such as light-emitting diodes or lasers. Multiple light-emitting elements may be provided in the light source in a one-dimensional or two-dimensional array. During operation, the control circuitry can individually adjust the light-emitting elements.

14 Claims, 12 Drawing Sheets

(56) References Cited

U.S. PATENT DOCUMENTS

| | | |
|---|---|---|
| 6,435,682 B1 | 8/2002 | Kaelin et al. |
| 8,585,207 B1 | 11/2013 | Bass et al. |
| 8,964,298 B2 | 2/2015 | Haddick et al. |
| 10,151,924 B2 | 12/2018 | Kim et al. |
| 10,203,501 B2 | 2/2019 | Komori et al. |
| 10,302,950 B2 | 5/2019 | Ouderkirk et al. |
| 2003/0090632 A1 | 5/2003 | Kim et al. |
| 2004/0114250 A1 | 6/2004 | Kato |
| 2004/0239880 A1 | 12/2004 | Kapellner et al. |
| 2006/0066557 A1 | 3/2006 | Floyd |
| 2006/0067090 A1* | 3/2006 | Lee ................. G02B 6/4214 362/615 |
| 2007/0177275 A1 | 8/2007 | McGuire, Jr. |
| 2009/0121658 A1 | 5/2009 | Steffen et al. |
| 2009/0147220 A1 | 6/2009 | Agostinelli et al. |
| 2010/0309298 A1* | 12/2010 | Muijs ................ H04N 13/305 348/59 |
| 2011/0128607 A1 | 6/2011 | Ishii |
| 2012/0038892 A1 | 2/2012 | Kurtz et al. |
| 2013/0208362 A1* | 8/2013 | Bohn .................. G02B 27/017 359/630 |
| 2013/0249945 A1 | 9/2013 | Kobayashi |
| 2014/0226134 A1 | 8/2014 | Seetzen et al. |
| 2015/0277123 A1 | 10/2015 | Chaum et al. |
| 2016/0062113 A1* | 3/2016 | El-Ghoroury ........ G09G 3/3413 345/647 |
| 2016/0073100 A1 | 3/2016 | Huang |
| 2016/0220324 A1 | 8/2016 | Tesar |
| 2017/0098429 A1 | 4/2017 | Sullivan et al. |
| 2017/0285343 A1 | 10/2017 | Belenkii et al. |
| 2017/0299850 A1* | 10/2017 | Childers .................. G21K 5/04 |
| 2018/0113311 A1 | 4/2018 | Klug et al. |
| 2018/0129057 A1* | 5/2018 | Morrison ........... G02B 27/1006 |
| 2018/0284441 A1 | 10/2018 | Cobb |
| 2018/0373033 A1* | 12/2018 | Oshima .............. G02B 27/0101 |
| 2019/0018245 A1 | 1/2019 | Cheng et al. |

FOREIGN PATENT DOCUMENTS

| | | |
|---|---|---|
| CN | 101881936 A | 11/2010 |
| CN | 101989033 A | 3/2011 |
| CN | 102360540 A | 2/2012 |
| CN | 102542927 A | 7/2012 |
| CN | 203224665 U | 10/2013 |
| CN | 103578367 A | 2/2014 |
| CN | 105334687 A | 2/2016 |
| CN | 105988266 A | 10/2016 |
| CN | 106170729 A | 11/2016 |
| CN | 106304461 A | 1/2017 |
| CN | 106662678 A | 5/2017 |
| CN | 107533166 A | 1/2018 |
| CN | 108051917 A | 5/2018 |
| CN | 108107579 A | 6/2018 |
| CN | 108139589 A | 6/2018 |
| CN | 108140346 A | 6/2018 |
| CN | 112051670 A | 12/2020 |
| DE | 102014003351 A | 9/2015 |
| EP | 3175295 A1 | 6/2017 |
| EP | 3296797 A1 | 3/2018 |
| JP | H08202292 A | 8/1996 |
| JP | H09508476 A | 8/1997 |
| JP | H10269802 A | 10/1998 |
| JP | 2005012303 A | 1/2005 |
| JP | 2007065677 A | 3/2007 |
| JP | 4068551 B2 | 3/2008 |
| JP | 2009211819 A | 9/2009 |
| JP | 2014513316 A | 5/2014 |
| JP | 2016517036 A | 6/2016 |
| TW | 201611572 A | 3/2016 |
| WO | 95/20811 A1 | 8/1995 |
| WO | 03/077013 A2 | 9/2003 |
| WO | 2014140620 A2 | 9/2014 |
| WO | 2016016083 A1 | 2/2016 |
| WO | 2019089283 A1 | 5/2019 |

\* cited by examiner

ELECTRONIC DEVICE WITH MULTI-ELEMENT DISPLAY ILLUMINATION SYSTEM

This application claims the benefit of provisional patent application No. 62/691,513, filed Jun. 28, 2018, which is hereby incorporated by reference herein in its entirety.

BACKGROUND

This relates generally to electronic devices and, more particularly, to electronic devices with displays.

Electronic devices often include displays. For example, a head-mounted device such as a pair of virtual reality or mixed reality glasses may have a display for displaying images for a user. The display may include a spatial light modulator with pixels that produce images for a user. An optical system provides illumination for the spatial light modulator so that the user can view the images.

It can be challenging to form display illumination systems for devices such as head-mounted devices. If care is not taken, an illumination system will not be sufficiently compact to wear on the head of a user or may not exhibit satisfactory optical performance.

SUMMARY

An electronic device may have a spatial light modulator. Control circuitry in the electronic device may use the spatial light modulator to generate images. A light source may be used to produce illumination for the spatial light modulator. An optical system may direct the illumination onto the spatial light modulator and may direct corresponding reflected image light towards eye boxes for viewing by a user.

Head-mounted support structures may be used to support the spatial light modulator, light source, and optical system. The light source may include light-emitting elements such as light-emitting diodes or lasers. Multiple light-emitting elements may be provided in the light source in a one-dimensional or two-dimensional array. During operation, the control circuitry can individually adjust the light-emitting elements.

The light-emitting elements may be arranged in an array so that different light-emitting elements produce light that illuminates different regions of the spatial light modulator. The light-emitting elements may include white light emitting elements or colored light-emitting elements such as red, green, and blue light-emitting elements.

The optical system may use lenses, optical combiners based on dichroic wedges, holograms, tunable gratings, metastructures, or other optical combiner structures, may include polarizing beam splitters, may include prisms, beam steering devices, and/or other optical components.

DETAILED DESCRIPTION

Head-mounted devices and other electronic devices may be used for virtual reality and mixed reality (augmented reality) systems. These devices may include portable consumer electronics (e.g., portable electronic devices such as cellular telephones, tablet computers, glasses, other wearable equipment), head-up displays in cockpits, vehicles, etc., display-based equipment (projectors, televisions, etc.). Devices such as these may include displays and other optical components. Device configurations in which virtual reality and/or mixed reality content is provided to a user (viewer) with a head-mounted display device are described herein as an example. This is, however, merely illustrative. Any suitable equipment may be used in providing a user with visual content such as virtual reality and/or mixed reality content.

A head-mounted device such as a pair of augmented reality glasses that is worn on the head of a user may be used to provide a user with computer-generated content that is overlaid on top of real-world content. The real-world content may be viewed directly by a user through a transparent portion of an optical system. The optical system may be used to route images from one or more pixel arrays in a display system to the eyes of a user. A waveguide such as a thin planar waveguide formed from a sheet of transparent material such as glass or plastic or other light guide may be included in the optical system to convey image light from the pixel arrays to the user. The display system may include reflective displays such as liquid-crystal-on-silicon displays, microelectromechanical systems (MEMs) displays (sometimes referred to as digital micromirror devices), or other displays.

Figure 1:
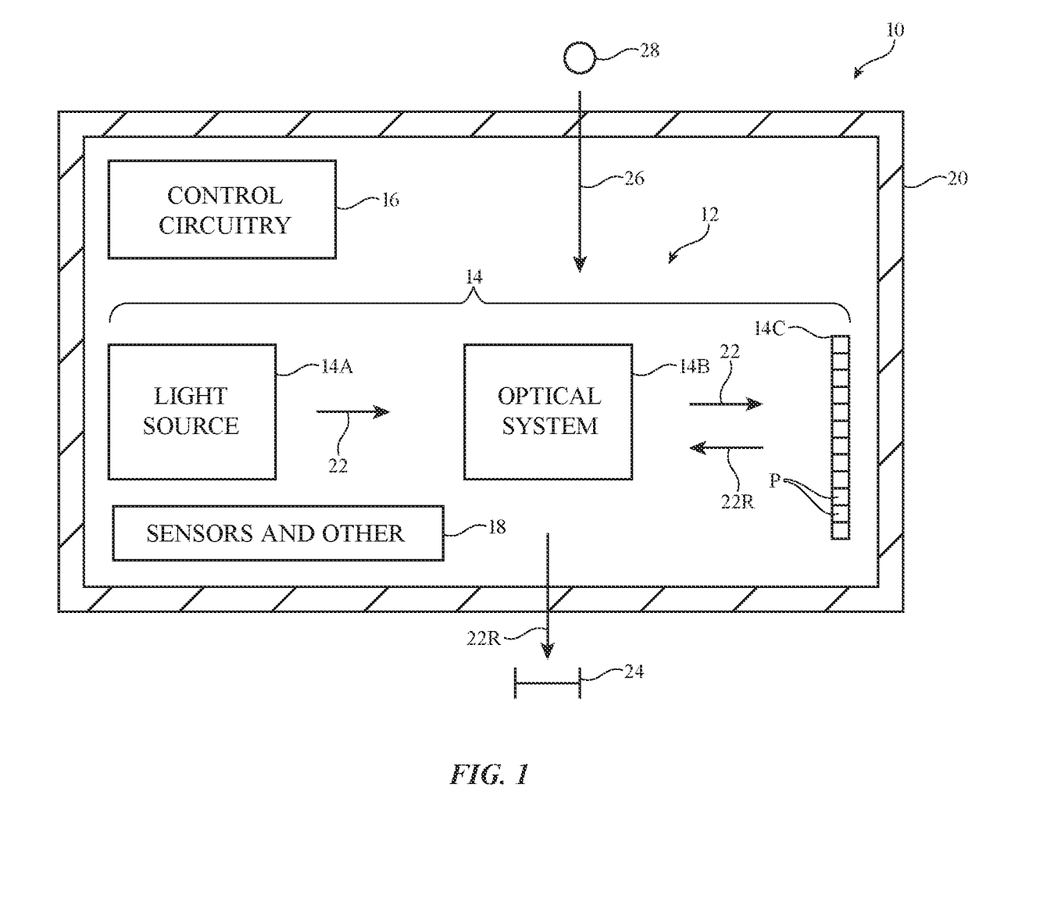
FIG. 1 is a diagram of an illustrative electronic device having a display in accordance with an embodiment.

A schematic diagram of an illustrative electronic device such as a head-mounted device is shown in FIG. 1. As shown in FIG. 1, head-mounted device 10 may have a head-mountable support structure such as support structure 20. The components of head-mounted display 10 may be supported by support structure 20. Support structure 20, which may sometimes be referred to as a housing, may be configured to form a frame of a pair of glasses (e.g., left and right temples and other frame members), may be configured to form a helmet, may be configured to form a pair of goggles, or may have other head-mountable configurations.

The operation of device 10 may be controlled using control circuitry 16. Control circuitry 16 may include storage and processing circuitry for controlling the operation of head-mounted display 10. Circuitry 16 may include storage such as hard disk drive storage, nonvolatile memory (e.g., electrically-programmable-read-only memory configured to form a solid state drive), volatile memory (e.g., static or dynamic random-access-memory), etc. Processing circuitry in control circuitry 16 may be based on one or more microprocessors, microcontrollers, digital signal processors, baseband processors, power management units, audio chips, graphics processing units, application specific integrated circuits, and other integrated circuits. Software code may be stored on storage in circuitry 16 and run on processing circuitry in circuitry 16 to implement operations for head-mounted display 10 (e.g., data gathering operations, operations involving the adjustment of components using control signals, image rendering operations to produce image content to be displayed for a user, etc.).

Head-mounted device 10 may include input-output circuitry such as input-output devices 12. Input-output devices 12 may be used to allow data to be received by head-mounted display 10 from external equipment (e.g., a tethered computer, a portable device such as a handheld device or laptop computer, or other electrical equipment) and to allow a user to provide head-mounted device 10 with user input. Input-output devices 12 may also be used to gather information on the environment in which head-mounted device 10 is operating. Output components in devices 12 may allow head-mounted device 10 to provide a user with output and may be used to communicate with external electrical equipment. Input-output devices 12 may include sensors and other components 18 (e.g., image sensors for gathering images of real-world object that are digitally merged with virtual objects on a display in device 10, accelerometers, depth sensors, light sensors, haptic output devices, speakers, batteries, wireless communications circuits for communicating between device 10 and external electronic equipment, etc.).

As shown in FIG. 1, input-output devices 12 may include one or more displays in a display system such as display system 14. Display system 14, which may sometimes be referred to as a display, may be used to display images for a user of head-mounted device 10. Display system 14 include a light source such as light source 14A that produces illumination 22. Illumination 22 may pass through optical system 14B and reflect off of spatial light modulator 14C. Spatial light modulator 14C may be a liquid-crystal-on-silicon device, a microelectromechanical systems (MEMs) device (e.g., a device with an array of micromirrors, sometimes referred to as a digital micromirror device), or other spatial light modulator.

Spatial light modulator 14C has an array of individually adjustable pixels P. During operation, control circuitry 16 can use spatial light modulator 14C to produce an image that is illuminated by illumination 22. Corresponding image light 22R (e.g., illumination 22 that has reflected from pixels P in spatial light modulator 14C and that therefore corresponds to a computer-generated (virtual) image formed by spatial light modulator) may be directed to eye boxes such as eye box 24 for viewing by the eyes of a user.

Optical system 14B may use prisms, mirrors, beamsplitters, holograms, gratings (e.g., electrically tunable gratings), lenses, waveguides, polarizers, and/or other optical components. Optical system 14B may use components such as these to form an optical combiner to pass image light 22 to spatial light modulator 14C while directing reflected image light 22R to eye box 24. System 14B may include lens structures (one or more discrete lenses and/or optical structures with an associated lens power) so that a viewable image is formed for the user in eye box 24. If desired, system 14B may contain components (e.g., an optical combiner, etc.) to allow real-world image light 26 (e.g., real-world images or real-world objects such as real-world object 28) to be combined optically with virtual (computer-generated) images such as virtual images in image light 22. In this type of system, which is sometimes referred to as an augmented reality system, a user of device 10 may view both real-world content and computer-generated content that is overlaid on top of the real-world content. Camera-based augmented reality systems may also be used in device 10 (e.g., in an arrangement which a camera captures real-world images of object 28 and this content is digitally merged with virtual content on spatial light modulator 14C). Display system 14 may be used in a virtual reality system (e.g., a system without merged real-world content) and/or any suitable type of system.

Figure 2:
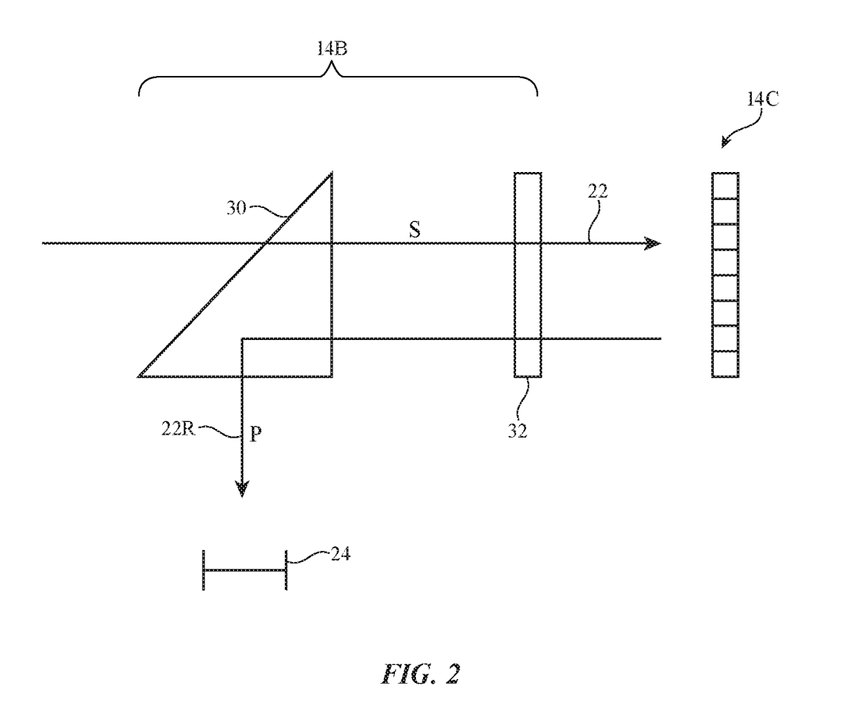
FIGS. 2 and 3 are diagrams of illustrative optical system components for providing illumination to a spatial light modulator and directing image light to an eye box for viewing by a user in accordance with embodiments.
Figure 3:
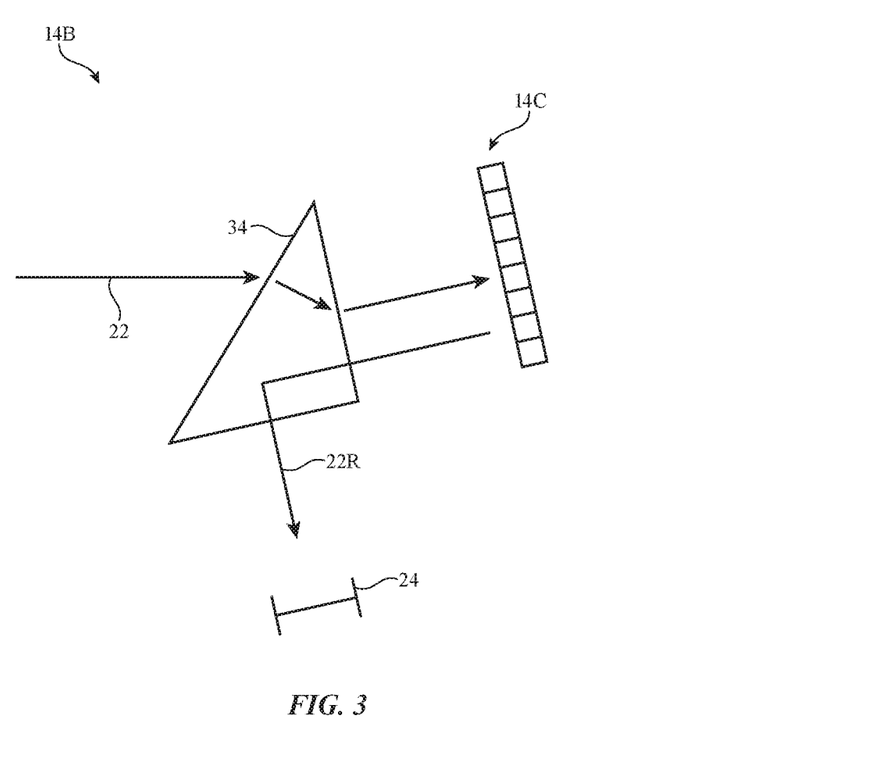

Illustrative configurations for portions of optical system 14B that may be used to pass illumination to spatial light modulator 14C while directing reflected image light from spatial light modulator 14C to eye boxes such as eye box 24 are shown in FIGS. 2 and 3. In the example of FIG. 2, optical system 14B includes polarizing beamsplitter 30 and quarter wave plate 32. Light 22 from light source 14A passes through polarizing beamsplitter 30. Light 22 may initially have a given polarization state (e.g., light 22 may be s-polarized at the output of beamsplitter 30 as shown in FIG. 2). After passing through quarter wave plate 32 and reflecting from the surface of spatial light modulator 14C, light 22R may have a different polarization state (e.g., an orthogonal linear polarization state such as the p-polarized state in the example of FIG. 2). This causes reflected light 22R to be directed towards eye box 24 by polarizing beamsplitter 30. In the example of FIG. 3, illumination 22 is directed towards spatial light modulator 14C through prism 34 and reflected image light 22R from spatial light modulator 14C is reflected by prism 34 toward eye box 24. Other configurations for optical system 14B that pass illumination to spatial light modulator 14C while directing reflected image light to eye boxes may be used, if desired (e.g., systems using waveguides, coupling elements formed from holograms, etc.). Optical system 14B may also include optical components that help gather and direct illumination to spatial light modulator 14C from light-emitting diodes or other light-emitting devices.

Display system 14 may use a multielement light source configuration. Light source 14A may be based on light-emitting diodes or lasers (e.g., vertical cavity surface emitting lasers or other diode lasers). As an example, light source 14A may have an array of three red light-emitting diodes, three green light-emitting diodes, and three blue light-emitting diodes. Each array of colored light-emitting diodes in this example may have multiple individually controllable light-emitting elements (e.g., diodes). Arrangements in which individually controllable light-emitting elements are based on lasers may also be used.

During operation, control circuitry 16 can control each of the light-emitting elements in light source 14A separately. In this way, illumination uniformity can be enhanced, local dimming operations can be performed on the image being displayed for the user, and/or display output can be selectively turned off in unused portions of a user's field of view to conserve power.

Figure 4:
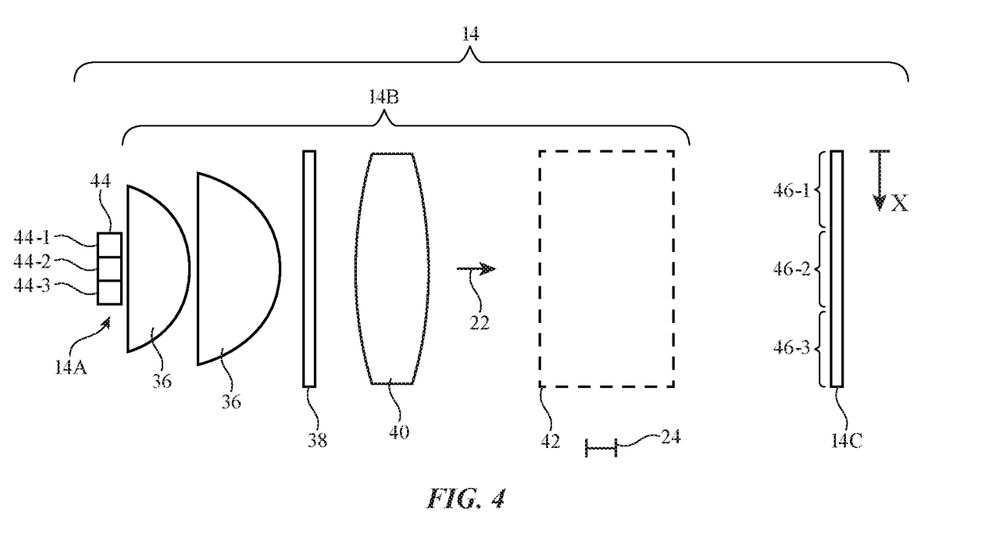
FIG. 4 is a diagram of an illustrative display system in accordance with an embodiment.

An illustrative multielement display system is shown in FIG. 4. As shown in FIG. 4, multielement light source 14A may have multiple individually controlled light-emitting elements 44. Collimating lenses 36, optional diffuser 38, and condenser lens 40 may be used to produce illumination 22 for spatial light modulator 14C. Optical system components (see, e.g., the illustrative optical components of FIG. 2 or FIG. 3) may be interposed in the optical path between light source 14A and spatial light modulator 14C at a location such as location 42 (e.g., to pass illumination 22 to spatial light modulator 14C while directing corresponding reflected image light from spatial light modulator 14C to eye boxes such as eye box 24). Such optical system components are omitted from optical system 14B of FIG. 4 and subsequent FIGS. to avoid over-complicating the drawings.

There are three light-emitting elements 44 in the example of FIG. 4, but other numbers of light-emitting elements 44 may be included in light source 14A, if desired (e.g., at least 3, at least 10, at least 50, at least 100, fewer than 150, fewer than 75, fewer than 40, fewer than 30, fewer than 20, fewer than 12, fewer than 5, etc. Elements 44 may produce light 22 of any suitable colors (e.g., white, red, green, blue, yellow, etc.). In some arrangements, sets of light-emitting elements 44 (e.g., one or more groups of three red light-emitting diodes, one or more groups of three green light-emitting diodes, etc.) may be incorporated into light source 14A.

Figure 5:
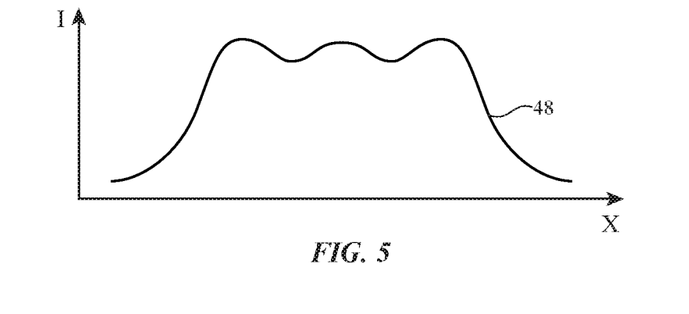
FIG. 5 is a graph in which illumination intensity has been plotted as a function of distance across the spatial light modulator of FIG. 4 in accordance with an embodiment.

As shown in FIG. 4, the optical components of system 14 may be configured so that light from first light-emitting element 44-1 is directed onto a first region 46-3 of spatial light modulator 14C, light from second light-emitting element 44-2 is directed onto a second region 46-2 of spatial light modulator 14C, and light from a third light-emitting element 44-3 is directed onto a third region 46-1. Each light source may produce light with a Lambertian intensity distribution or other suitable intensity profile and the emitted light from each source may overlap slightly. The resulting overall light distribution for light source 14A on spatial light modulator 14C is shown by curve 48 of FIG. 5, which is a graph in which illuminance I of the illumination from light source 14A that is illuminating spatial light modulator 14C has been plotted as a function of lateral distance X across spatial light modulator 14C. The three peaks of curve 48 correspond to the three elements 44 of light source 14A in the example of FIG. 4 and may be individually adjusted (e.g., to turn off illumination for unused portions of display system 14 to conserve power, to adjust relative light intensity to help create a uniform light distribution, etc.). Variations of light intensity within each illuminated region can be compensated by adjusting the pixels of spatial light modulator 14C accordingly. No light homogenizers (e.g., fly's eye lens arrays) other than diffuser 38 (e.g., a thin frosted glass, a layer of polymer with light-scattering particles, etc.) need be included in system 14B, which helps reduce the volume occupied by system 14B and display system 14. If desired, diffuser 38 may be omitted from system 14B.

Figure 6:
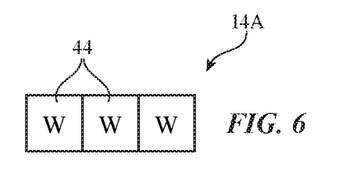
FIGS. 6, 7, and 8 are diagrams of illustrative multielement light sources for display illumination systems in accordance with embodiments.

Light-emitting elements 44-1, 44-2, and 44-3 of FIG. 4 may, if desired, be white light sources W, as shown in FIG. 6. Light source 14A of FIG. 4 has a one-dimensional array with three elements. In general, there may be N×M elements 44 in light source 14A, where N and/or M may be at least 1, at least 2, at least 3, at least 4, at least 5, at least 10, at least 20, at least 50, fewer than 100, fewer than 25, fewer than 11, fewer than 6, or other suitable values.

Figure 7:
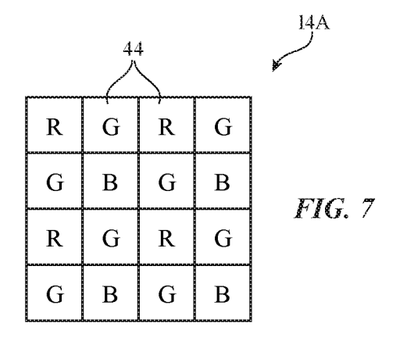

FIG. 7 shows how elements 44 may be arranged in a two-dimensional array of red R, green G, and blue B light-emitting elements 44. There may be more green elements than red and blue elements (e.g., to accommodate the enhanced sensitivity of human eyes to green light) and/or other numbers of red, green, and blue elements may be included in light source 14A.

Figure 8:
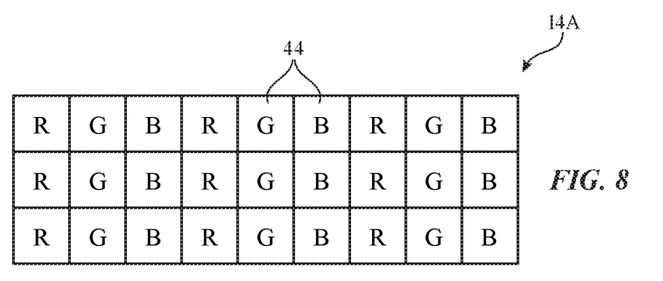

FIG. 8 shows another illustrative arrangement. In the example of FIG. 8, each set of R, G, and B light-emitting elements 44 is located at a different array location in a 3×3 array (e.g., each of the locations of the 3×3 array may include a packaged light-emitting device containing three light-emitting elements 44). In general, any suitable packaging scheme may be used for elements 44 (e.g., schemes in which commonly colored light-emitting elements are formed in common packages, schemes in which light-emitting elements of different colors are placed in common packages, arrangements in which all of elements 44 in light source 14A are formed on a common substrate, etc.).

Figure 9:
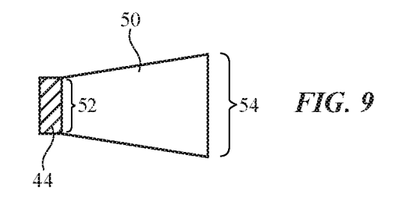
FIG. 9 is a cross-sectional side view of a portion of a tapered light tunnel array and associated light source element in accordance with an embodiment.

In some arrangements for light source 14A, light-emitting diodes with relatively small dimensions (e.g., micro-light-emitting diodes or vertical cavity surface emitting lasers with lateral dimensions of less than 10 microns), may be used in forming elements 44. Configurations in which the lateral dimensions of light-emitting elements (light-emitting diodes or lasers) are more than 10 microns, 10-200 microns, at least 40 microns, less than 500 microns, or other suitable sizes may also be used. If desired, light-emitting elements 44 may be provided with optional tapered tunnels such as tapered tunnel 50 of FIG. 9. Each tunnel, which may be, for example, part of a two-dimensional tunnel array that mates with a corresponding two-dimensional array of light-emitting devices 44, may be formed form clear polymer or other transparent material and may expand the size of the emitted light area of each light-emitting element 44 (e.g., from smaller area 52 of FIG. 9 at the input of tapered tunnel 50 to enlarged area 54 at the output surface of tapered tunnel 50).

Figure 10:
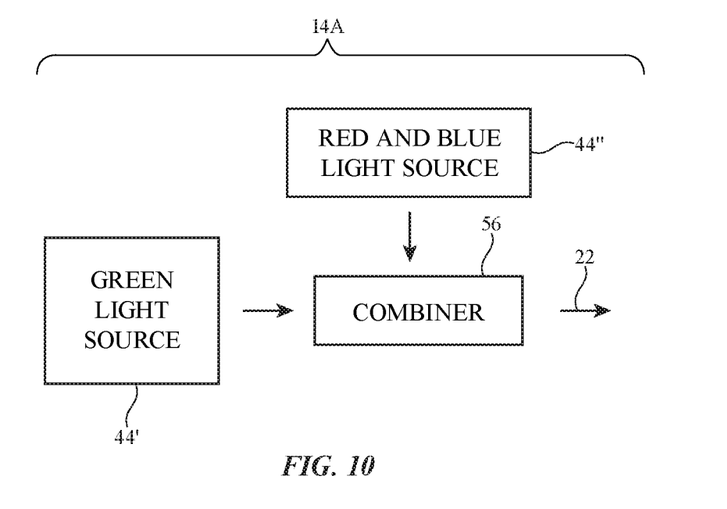
FIG. 10 is a diagram of an illustrative illumination system that includes a combiner that combines light of different wavelengths to provide multiwavelength illumination in accordance with an embodiment.
Figure 11:
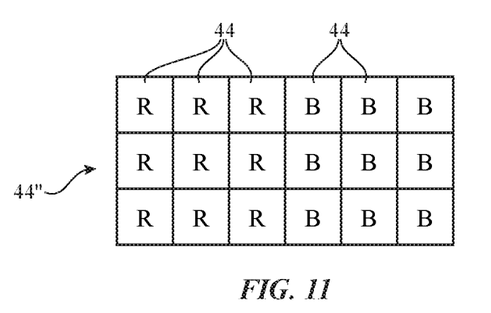
FIGS. 11 and 12 are diagrams of illustrative patterns of light-emitting elements that may be used in forming a multielement light source for the illustrative system of FIG. 10 in accordance with an embodiment.
Figure 12:
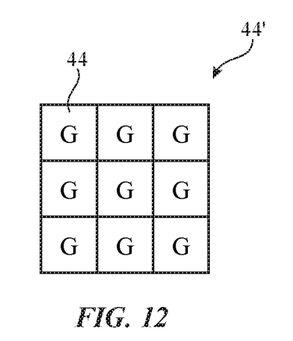

If desired, a wavelength selective optical combiner may be used to merge illumination 22 of different wavelengths. Consider, as an example, illustrative multiwavelength light source 14A of FIG. 10. As shown in FIG. 10, light source 14A may include a first set of light-emitting elements 44' (e.g., green light-emitting elements 44) and a second set of light-emitting elements 44" (e.g., sets of red and blue light-emitting elements 44). Combiner 56 may combine the green light from source 44' and the red and blue light from source 44" to produce red, green, and blue illumination 22. Combiner 56 may be based on a wedge dichroic combiner (e.g., a wedge-shaped substrate that includes a red-light-reflecting-and-green-light-passing dichroic coating on a first surface of the substrate facing source 44" and that includes a blue-light-reflecting-and-green-light passing dichroic coating on a second opposing surface of the substrate). The wedge dichroic combiner will reflect red and blue light towards spatial light modulator 14C and will allow green light to pass towards spatial light modulator 14C. This arrangement or other wavelength multiplexing arrangements (e.g., wavelength multiplexers based on holograms, nanostructures, tunable optical components such as tunable gratings, etc.) may combine the light output from sources 44' and 44" so that illumination 22 includes individually adjustable red, green, and blue light components. Different regions of spatial light modulator 14C may be illuminated by light from different elements 44. During operation, individual elements 44 may be independently adjusted to adjust the spatial distribution of illumination 22 on spatial light modulator 14C. With one illustrative configuration, light source 44" includes a 3×3 array of red light-emitting elements 44 and a 3×3 array of blue light-emitting elements 44, as shown in FIG. 11, and light source 44' includes a 3×3 array of green light-emitting elements 44, as shown in FIG. 12 and each light-emitting element 44 may be individually adjusted. Other numbers of elements 44 may be included in light source 14A if desired.

Figure 13:
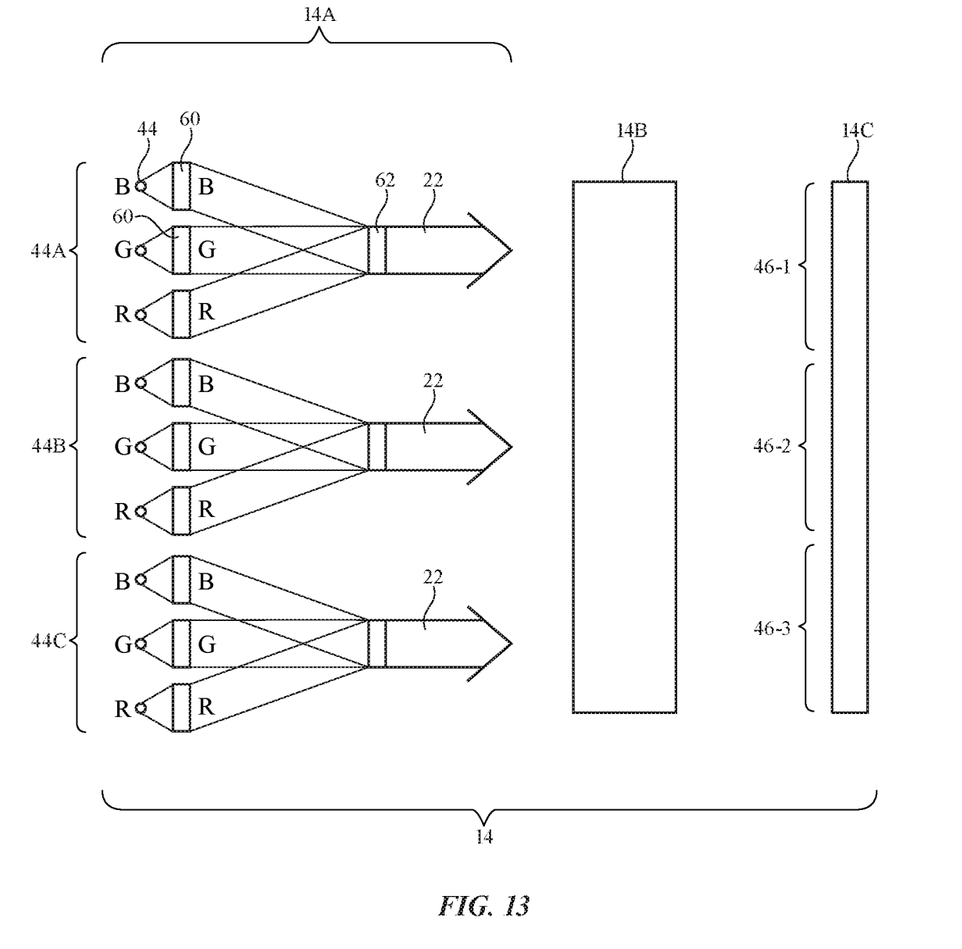
FIG. 13 is a diagram of an illustrative display system having an optical system with components for combining light of multiple wavelengths to provide multiwavelength illumination to a spatial light modulator in accordance with an embodiment.

In the illustrative configuration of light source 14A that is shown in FIG. 13, collimator and beam steering elements 60 are used to selectively route light from light-emitting elements 44 such as blue element B, green elements G, and red elements R to spectral and angular combiner elements 62. Spectral and angular combiner elements combine red, green, and blue light from corresponding red, green, and blue elements 44 into a portion of illumination 22. Elements 60 and/or 62 may be formed from multiplexed volume holograms, switchable Bragg gratings (e.g., electrically adjustable liquid crystal gratings), and metamaterial elements (e.g., nanostructure elements each formed from an array of nanopillars of transparent material on a transparent substrate that have heights and other attributes that are configured to allow each element to serve as a wavelength multiplexer for light passing through the substrate of that element). As shown in FIG. 13, a first set 44A of elements 44 may be configured to provide illumination 22 in first area 46-3 of spatial light modulator 14C, a second set 44B of elements 44 may be configured to provide illumination 22 in second area 46-2 of spatial light modulator 14C, and a third set 44C of elements 44 may be configured to provide illumination 22 in third light area 46-1 of spatial light modulator 14C. Elements 44 may be arranged in a one-dimensional array (e.g., elements 44 may all lie in the page of FIG. 13) or may be formed in a two-dimensional array.

Figure 14:
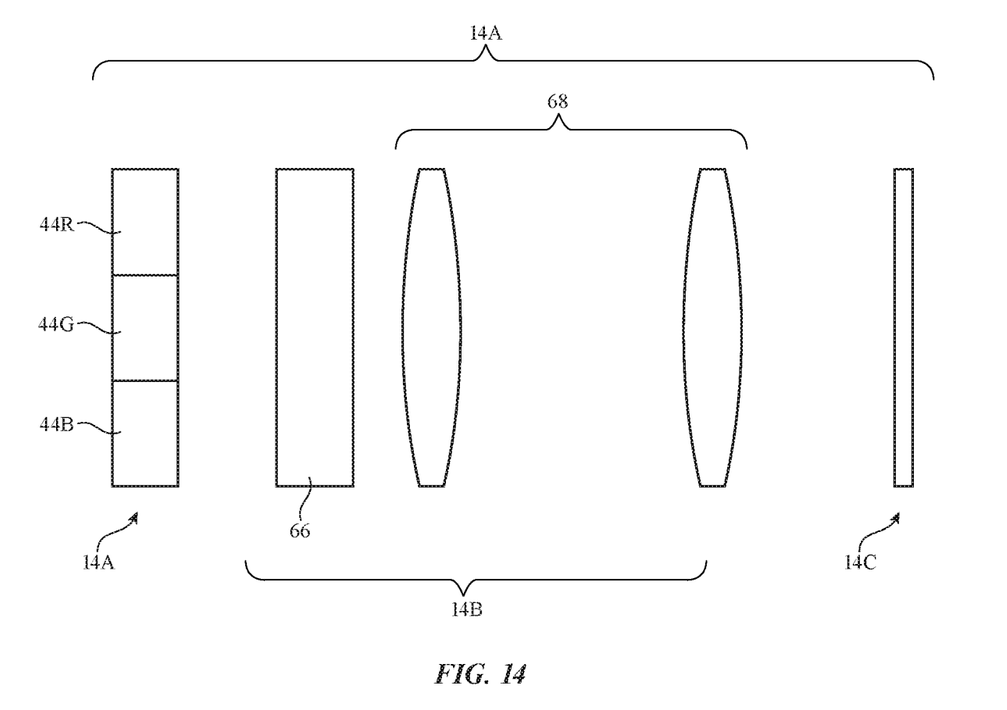
FIGS. 14 and 15 are diagrams of an illustrative display system with a fly's eye array and a multielement light sources in accordance with an embodiment.
Figure 15:
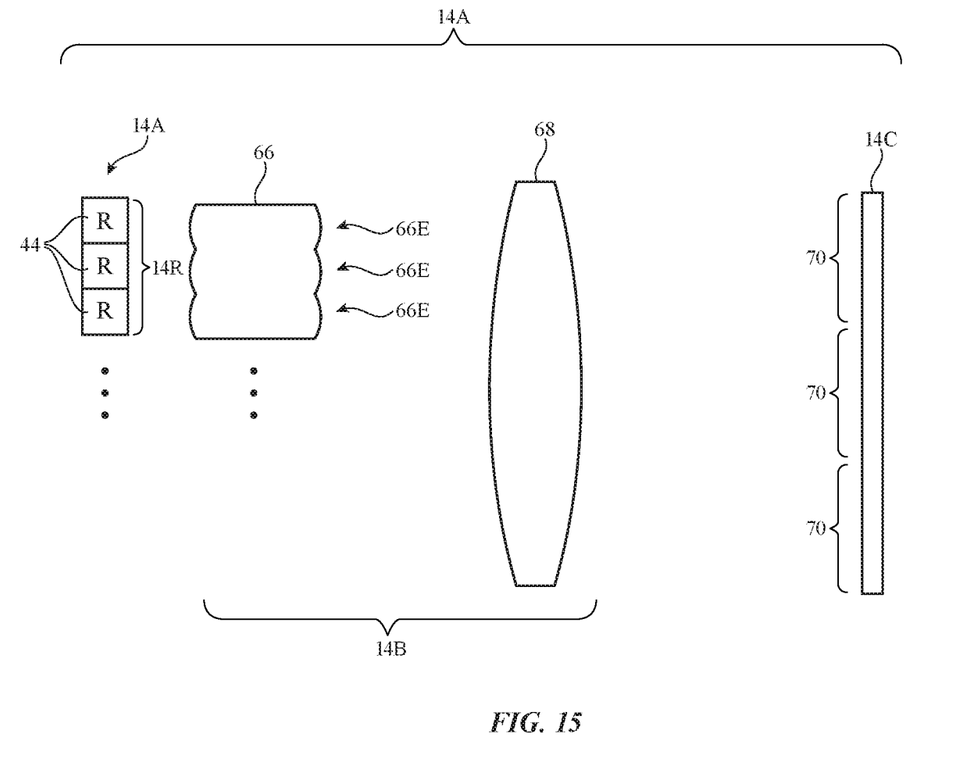

Another illustrative arrangement for display system 14 is shown in FIGS. 14 and 15. In this illustrative configuration, light-emitting element set 44R includes nine elements 44 that produce red light (e.g., in a 3×3 array), light-emitting element set 44G includes nine elements 44 that produce green light (e.g., in a 3×3 array), and light-emitting set 44B includes three blue light-emitting elements 44 (e.g., in a 3×3 array). There may be, as an example, nine sets of elements 44 in a 3×3 array of sets (only one column of sets being shown in FIG. 14). Optical system 14B may include a fly's eye lens array 66 and relay lens 68 (e.g., a relay lens formed from two or more lens elements or other suitable relay lens).

As shown in FIG. 15, lens array 66 may include microlenses such as lenses 66E that each receive and homogenize light emitted from a respective light-emitting element 44 and that provide that light to relay lens 68. Elements 44 may be organized in a one-dimensional array or a two-dimensional array. Optical system 14B may be configured so that elements 44 provide light to a different areas of spatial light modulator 14C. For example, each of the three red elements R of set 14R of FIG. 15 may be individually adjusted to individually control light 22 in three respective regions 70 on spatial light modulator 14C.

Figure 16:
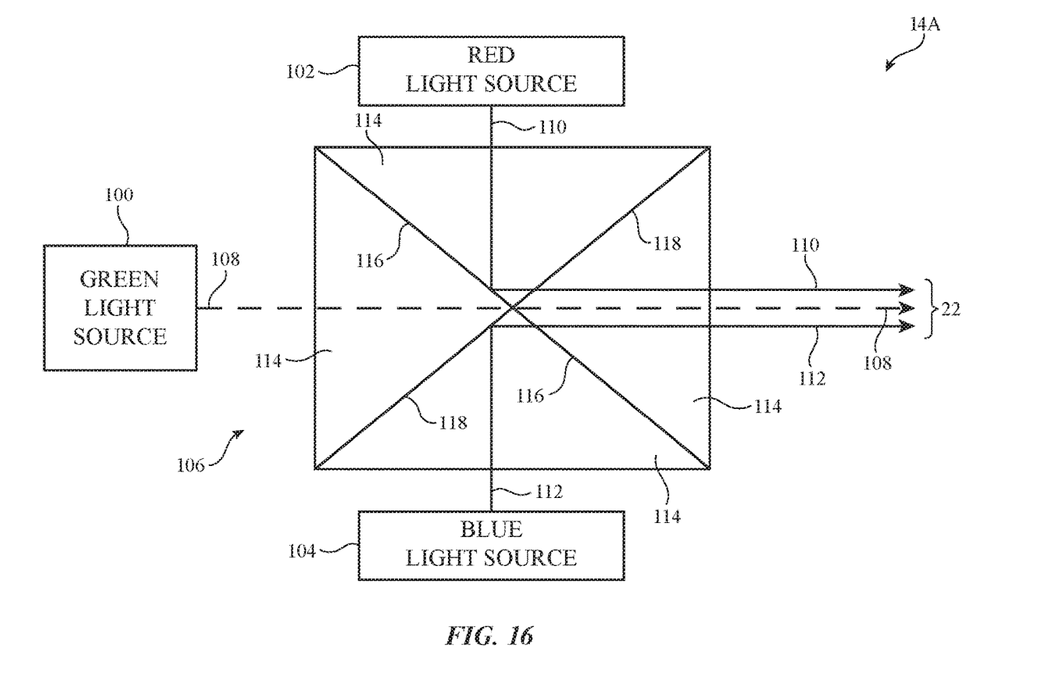
FIG. 16 is a diagram of an illustrative display system with an optical combiner that includes wedge-shaped substrates in accordance with an embodiment.

FIG. 16 is a diagram of another illustrative optical combiner that may be used to merge illumination 22 of different wavelengths. As shown in FIG. 16, light source 14A may include a green light source 100, a red light source 102, and a blue light source 104. Green light source 100 may be an M-by-N or N-by-N array of green light-emitting elements 44. Red light source 102 may be an M-by-N or N-by-N array of red light-emitting elements 44. Blue light source 104 may be an M-by-N or N-by-N array of blue light-emitting elements 44. Light sources 100, 102, and 104 may be 7-by-7 arrays, 1-by-1 arrays, or 3-by-3 arrays of light-emitting elements 44, as just a few examples.

Light source 14A may include optical combiner 106 (e.g., an optical combiner such as optical combiner 56 of FIG. 10). Optical combiner 106 may include red-light-reflecting-and-green-light-passing dichroic coating 116 and blue-light-reflecting-and-green-light-passing dichroic coating 118. Coatings 116 and 118 may be formed on the surfaces of wedge-shaped substrates 114. Optical combiner 106 will reflect red light 110 from red light source 102, will reflect blue light 112 from blue light source 104, and will allow green 108 light from green light source 100 to pass as illumination 22 towards a spatial light modulator (e.g., spatial light modulator 14C of FIGS. 1-4 and 13-15). When configured in this way, light 110, 108, and 112 may be coaxially aligned when provided to the spatial light modulator.

Figure 17:
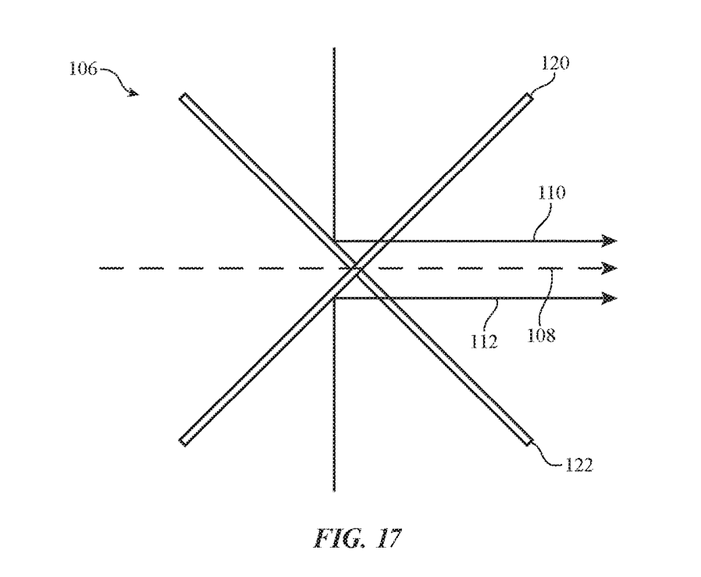
FIG. 17 is a diagram of an illustrative display system with an optical combiner without wedge-shaped substrates in accordance with an embodiment.

In the example of FIG. 16, optical combiner 106 includes four wedge-shaped substrates 114. This is merely illustrative and, in general, optical combiner 106 may include any desired number of wedge-shaped substrates 114 or may include substrates of other shapes. Light sources 100, 102, and 104 may emit light of any desired wavelengths (e.g., coating 116 may pass light from light source 100 while reflecting light from light source 102 whereas coating 118 may pass light from light source 100 while reflecting light from light source 104). Optional collimating optics such as lenses may be interposed between light sources 100, 102, and 104 and optical combiner 106 if desired. In another suitable arrangement, optical combiner 106 may be formed without wedge-shaped substrates, as shown in the example of FIG. 17. As shown in FIG. 17, optical combiner 106 may include red-light-reflecting-and-green-light-passing plate 122 and blue-light-reflecting-and-green-light-passing dichroic plate 120. Plates 120 and 122 may, for example, include glass substrates or other substantially planar substrates provided with dichroic coatings.

Figure 18:
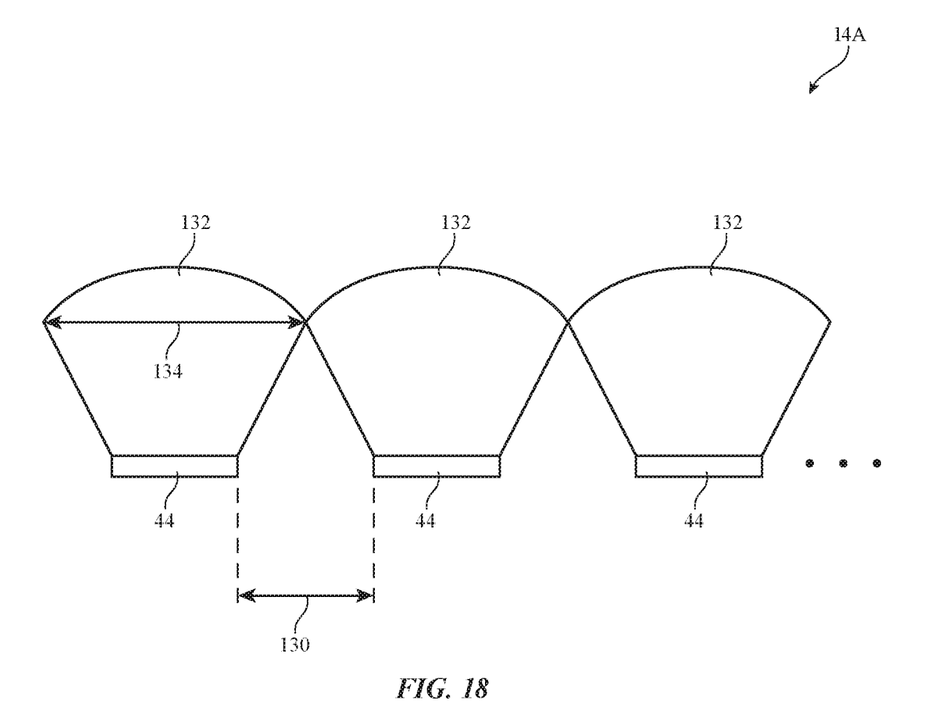
FIG. 18 is a diagram of an illustrative display system with microlenses over light-emitting elements for minimizing gaps between the light-emitting elements in accordance with an embodiment.

The example of FIG. 15 in which microlenses 66E are provided in lens array 66 is merely illustrative. In another suitable arrangement, each light-emitting element 44 may be provided with a respective microlens, as shown in FIG. 18. As shown in FIG. 18, light-emitting elements 44 in light source 14A may be relatively small, such that elements 44 are separated by gaps 130. A respective microlens 132 may be provided over each element 44. Each microlens 132 may have width 134 that is much wider than the underlying element 44, such that adjacent microlenses 132 bridge the gaps 130 between elements 44. This may allow light from each element 44 to appear as if it was being emitted over a greater area (e.g., the area provided by microlenses 132) than would otherwise be provided in the absence of microlenses 132.

Figure 19:
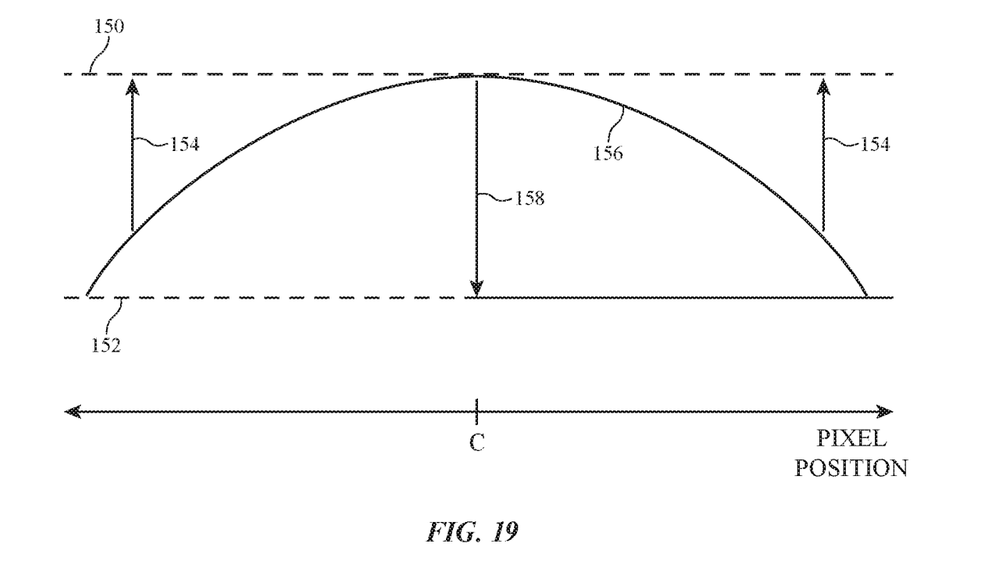
FIG. 19 is a diagram showing how light-emitting elements may be independently controlled as a function of pixel position to compensate for off-axis intensity variations in illumination provided to a spatial light modulator in accordance with an embodiment.

If desired, the intensity of the light-emitting elements 44 in light source 14A may be independently controlled to compensate for inherent off-axis roll off in intensity and/or distortion on light from the peripheral pixels associated with optics (e.g., optics in optical system 14B) that provide variable magnification as a function of pixel position. FIG. 19 is a diagram showing how the intensity of light-emitting elements 44 may be independently controlled to mitigate these effects.

As shown in FIG. 19, the horizontal axis illustrates pixel position along a lateral axis of light source 14A (e.g., horizontal or vertical pixel position across an array of M-by-N or N-by-N light-emitting elements 44, as described above in connection with FIGS. 4-18). Curve 156 of FIG. 19 illustrates the intensity of illumination 22 produced by light source 14A. Curve 150 illustrates the maximum intensity producible by light source 14A. As shown by curve 156, illumination 22 may exhibit a roll off from a peak intensity at central axis C to a minimum intensity at pixel positions off of central axis C (e.g., for pixels at the periphery of the array). This variation in intensity may, for example, be produced by inherent off-axis roll off in intensity associated with light source 14A and/or optical system 14B and/or off-axis distortion on light from peripheral pixels produced by the lens elements in optical system 14B (e.g., lens elements that provide variable magnification as a function of pixel position).

In order to mitigate this variation, light-emitting elements 44 located off of central axis C (e.g., at the periphery of the array) may be independently controlled to emit light with an increased intensity, as shown by arrows 154. This boost in peripheral pixel intensity may provide illumination 22 with a uniform intensity for each pixel position by the time the light has passed through optical system 14B. In another suitable arrangement, light-emitting elements 44 located at central axis C may be independently controlled to emit light with decreased intensity (e.g., with an intensity that matches that of the lowest-intensity pixels), as shown by arrow 158. This reduction in central pixel intensity may provide illumination 22 with a uniform intensity for each pixel position by the time the light has passed through optical system 14B. These adjustments in intensity may be provided by adjusting the current provided to each light-emitting element 44, by adjusting the pulse width modulation used to control each light-emitting element 44, etc. By independently controlling the intensity of each light-emitting element 44 in the array as a function of pixel position, light of uniform intensity may be provided despite distortions introduced by optical system 14B. In another suitable arrangement, pre-distortion techniques may be used instead of or in addition to these pixel-by-pixel intensity adjustments to provide illumination 22 with uniform intensity. The example of FIG. 19 is merely illustrative. Curves 150, 156, and 152 may have other shapes.

The foregoing is merely illustrative and various modifications can be made to the described embodiments. The foregoing embodiments may be implemented individually or in any combination.

What is claimed is:

1. An electronic device comprising:
   light sources configured to produce illumination;
   a spatial light modulator configured to produce light by reflecting the illumination; and
   optics configured to redirect the light, wherein
      the optics impart the light with an off-axis roll off in intensity across a field of view of the light,
      the light sources are configured to compensate for the off-axis roll off in intensity produced by the optics, and
      the optics comprise a hologram or an optical combiner.

2. The electronic device of claim 1, wherein the optics comprise at least one lens.

3. The electronic device of claim 1, wherein the optics comprise a waveguide.

4. The electronic device of claim 1, wherein the spatial light modulator comprises a digital micromirror device.

5. The electronic device of claim 1, wherein the spatial light modulator comprises a liquid-crystal-on-silicon device.

6. The electronic device of claim 1, wherein the light sources are arranged in an array.

7. The electronic device of claim 6, wherein the light sources comprise a first light source at a central axis of the array and a second light source off the central axis of the array, the first light source has a first intensity, and the second light source has a second intensity less than the first intensity.

8. The electronic device of claim 1, wherein the light sources are configured to compensate for the off-axis roll off in intensity by producing the illumination with an intensity profile that varies across the field of view.

9. An electronic device comprising:
   light sources configured to produce illumination;
   a spatial light modulator configured to produce light by reflecting the illumination; and
   optics configured to redirect the light, wherein the optics impart the light with an off-axis roll off in intensity across a field of view of the light, the light sources are configured to compensate for the off-axis roll off in intensity produced by the optics, the light sources are configured to compensate for the off-axis roll off in intensity by producing the illumination with an intensity profile that varies across the field of view, and the intensity profile decreases away from a central axis of the field of view.

10. An electronic device comprising:
    light sources configured to produce illumination;
    a spatial light modulator configured to produce light by reflecting the illumination;
    optics configured to redirect the light, wherein
       the optics impart the light with an off-axis roll off in intensity across a field of view of the light, and
       the light sources are configured to compensate for the off-axis roll off in intensity produced by the optics; and
    one or more processors configured to provide image data to the spatial light modulator, the one or more processors being configured to further compensate for the off- axis roll off in intensity by pre-distorting the image data.

11. An electronic device comprising:
    an array of light sources configured to emit illumination;
    a spatial light modulator configured to generate reflected light based on the illumination; and
    optics configured to direct the reflected light, the array of light sources being configured to exhibit an intensity profile that has a variation across a field of view of the reflected light, wherein
       the optics impart the reflected light with an off-axis distortion across the field of view that at least partially reverses the variation in the intensity profile exhibited by the one or more light sources, and the one or more processors are configured to control the array of light sources to exhibit the intensity profile by performing an operation selected from the group consisting of:

adjusting pulse width modulation of the light sources across the array, and adjusting current provided to the light sources across the array.

12. The electronic device of claim 11, wherein the spatial light modulator comprises a digital micromirror device.

13. The electronic device of claim 11, wherein the spatial light modulator comprises a liquid-crystal-on-silicon device.

14. The electronic device of claim 11, the one or more processors being configured to provide image data to the spatial light modulator and being configured to further compensate for the off-axis roll off in intensity by pre-distorting the image data.

* * * * *